United States Patent
Kono et al.

(10) Patent No.: US 11,472,286 B2
(45) Date of Patent: Oct. 18, 2022

(54) VEHICLE

(71) Applicant: SUBARU CORPORATION, Tokyo (JP)

(72) Inventors: Takashi Kono, Tokyo (JP); Ayumu Yanagita, Tokyo (JP); Hiroshi Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 310 days.

(21) Appl. No.: 16/866,173

(22) Filed: May 4, 2020

(65) Prior Publication Data

US 2021/0016659 A1 Jan. 21, 2021

(30) Foreign Application Priority Data

Jul. 16, 2019 (JP) .............................. JP2019-131248

(51) Int. Cl.
*B60L 15/20* (2006.01)
*B60K 23/08* (2006.01)
(Continued)

(52) U.S. Cl.
CPC ............ *B60K 23/0808* (2013.01); *B60K 1/02* (2013.01); *B60K 17/356* (2013.01); *B60L 15/20* (2013.01); *B60L 50/60* (2019.02); *B60K 2001/006* (2013.01); *B60K 2023/085* (2013.01); *B60L 2240/425* (2013.01)

(58) Field of Classification Search
CPC .... B60K 23/0808; B60K 1/02; B60K 17/356; B60K 2001/006; B60K 2023/085; B60L 15/20; B60L 50/60; B60L 2240/425; B60L 15/2036; B60L 2220/42; B60L 2240/16; B60L 2240/423; B60L 2250/26;
(Continued)

(56) References Cited

U.S. PATENT DOCUMENTS

2012/0101675 A1\* 4/2012 Saito ................. B60W 30/1843
701/22
2017/0282891 A1 10/2017 Shimizu et al.
(Continued)

FOREIGN PATENT DOCUMENTS

| CN | 109715431 A | * | 5/2019 | ............ B60B 35/14 |
| JP | 2006115664 A | * | 4/2006 | |
| JP | 2017-178053 A | | 10/2017 | |

*Primary Examiner* — Justin Holmes
(74) *Attorney, Agent, or Firm* — McGinn I.P. Law Group, PLLC.

(57) ABSTRACT

A vehicle includes a front-wheel motor, a rear-wheel motor, a temperature detector, and a distribution ratio controller. The front-wheel motor drives a front wheel. The rear-wheel motor drives a rear wheel. The temperature detector detects a temperature of the front-wheel motor and a temperature of the rear-wheel motor. If one of the temperature of the front-wheel motor and the temperature of the rear-wheel motor exceeds a second temperature, the distribution ratio controller decreases a torque of one of the front-wheel motor and the rear-wheel motor the temperature of which is higher than the other and increase a torque of the other. The second temperature is a value set lower than a first temperature that is a threshold used for determination as to whether output of the front-wheel motor or output of the rear-wheel motor is to be restricted.

16 Claims, 8 Drawing Sheets

(51) Int. Cl.
*B60K 1/02* (2006.01)
*B60L 50/60* (2019.01)
*B60K 17/356* (2006.01)
*B60K 1/00* (2006.01)

(58) Field of Classification Search
CPC .... B60L 2260/28; B60L 3/0061; B60L 15/32; Y02T 10/64; Y02T 10/70; Y02T 10/72
See application file for complete search history.

(56) References Cited

U.S. PATENT DOCUMENTS

2019/0092188 A1\* 3/2019 Plianos .............. B60L 15/2009
2019/0232798 A1\* 8/2019 Ienaga ................ B60W 10/08

\* cited by examiner

VEHICLE

CROSS-REFERENCE TO RELATED APPLICATIONS

The present application claims priority from Japanese Patent Application No. 2019-131248 filed on Jul. 16, 2019, the entire contents of which are hereby incorporated by reference.

BACKGROUND

The disclosure relates to a vehicle.

There is a technique for controlling a distribution ratio between a torque of a driving device that drives front wheels and a torque of a driving device that drives rear wheels (for example, Japanese Unexamined Patent Application Publication No. 2017-178053).

SUMMARY

A first aspect of the disclosure provides a vehicle including a front-wheel motor, a rear-wheel motor, a temperature detector, and a distribution ratio controller. The front-wheel motor drives a front wheel. The rear-wheel motor drives a rear wheel. The temperature detector detects a temperature of the front-wheel motor and a temperature of the rear-wheel motor. If one of the temperature of the front-wheel motor and the temperature of the rear-wheel motor exceeds a second temperature, the distribution ratio controller decreases a torque of one of the front-wheel motor and the rear-wheel motor the temperature of which is higher than the other and increase a torque of the other. The second temperature is a value set lower than a first temperature that is a threshold used for determination as to whether output of the front-wheel motor or output of the rear-wheel motor is to be restricted.

A second aspect of the disclosure provides a vehicle including a front-wheel motor, a rear-wheel motor, a temperature detector, and circuitry. The front-wheel motor drives a front wheel. The rear-wheel motor drives a rear wheel. The temperature detector detects a temperature of the front-wheel motor and a temperature of the rear-wheel motor. If one of the temperature of the front-wheel motor and the temperature of the rear-wheel motor exceeds a second temperature, the circuitry decreases a torque of one of the front-wheel motor and the rear-wheel motor the temperature of which is higher than the other and increases a torque of the other, the second temperature being a value set lower than a first temperature that is a threshold used for determination as to whether output of the front-wheel motor or output of the rear-wheel motor is to be restricted.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
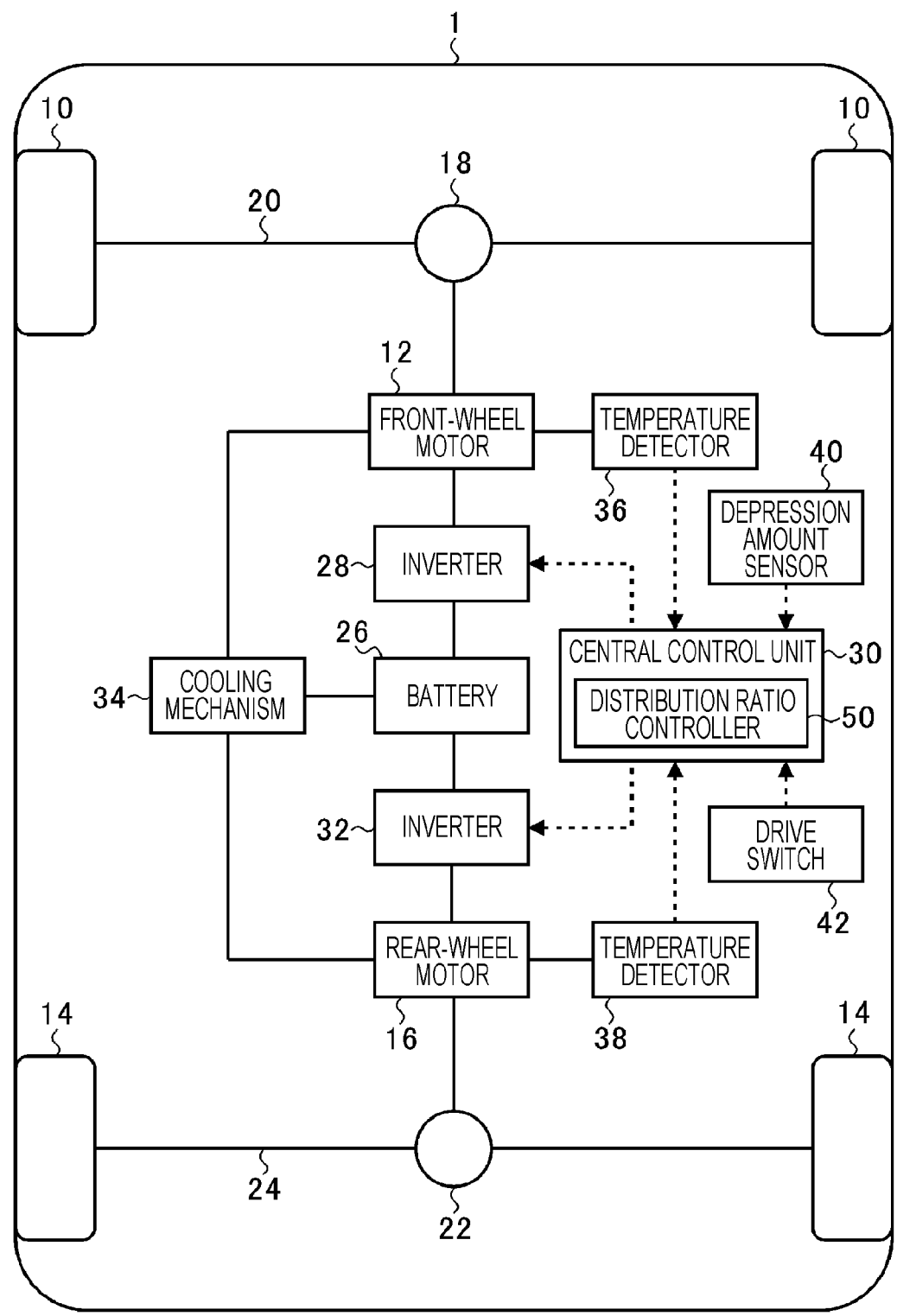
FIG. 1 schematically illustrates a configuration of a vehicle according to an embodiment.

A front-wheel motor that drives front wheels and a rear-wheel motor that drives rear wheels are likely to have higher temperatures as higher torques are distributed. If the front-wheel motor and the rear-wheel motor have excessively high temperatures, outputs are restricted in order to prevent malfunction. If the output of any one of the front-wheel motor and the rear-wheel motor is restricted, a vehicle is forced to be front-wheel drive or rear-wheel drive (i.e., 2WD). In this case, the vehicle is incapable of being all-wheel drive (i.e., AWD), and the traveling efficiency or stability may decrease.

Accordingly, it is desirable to provide a vehicle that can suppress restriction of the output of the front-wheel motor or the rear-wheel motor.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. The vehicle 1 includes front wheels 10, a front-wheel motor 12, rear wheels 14, a rear-wheel motor 16, a front differential gear 18, a front drive shaft 20, a rear differential gear 22, a rear drive shaft 24, a battery 26, inverters 28 and 32, a central control unit 30, a cooling mechanism 34, temperature detectors 36 and 38, a depression amount sensor 40, and a drive switch 42.

The vehicle 1 is an electric car in which driving sources are the front-wheel motor 12 that drives the front wheels 10 and the rear-wheel motor 16 that drives the rear wheels 14. For example, the front-wheel motor 12 and the rear-wheel motor 16 are, but not limited to, permanent magnet synchronous motors, or may be induction motors or the like. In addition, the front-wheel motor 12 and the rear-wheel motor 16 may have different specifications (e.g., rated output) or may have the same specifications. Hereinafter, the front-wheel motor 12 and the rear-wheel motor 16 may collectively be called as motors.

The front-wheel motor 12 has a rotary shaft coupled to the front differential gear 18. The front differential gear 18 is coupled to the front wheels 10 via the front drive shaft 20. The rear-wheel motor 16 has a rotary shaft coupled to the rear differential gear 22. The rear differential gear 22 is coupled to the rear wheels 14 via the rear drive shaft 24.

The battery 26 is, for example, a secondary battery such as a lithium ion battery. The inverter 28 is coupled to the battery 26 and the front-wheel motor 12. The inverter 28 converts a direct-current power from the battery 26 into an alternating-current power in accordance with a torque command transmitted from the central control unit 30 to supply the power to the front-wheel motor 12. The front-wheel motor 12 consumes the alternating-current power supplied via the inverter 28 to drive the rotary shaft. Thus, the front-wheel motor 12 drives the front wheels 10 with the torque in accordance with the torque command via the front differential gear 18 and the front drive shaft 20.

The front-wheel motor 12 above may also serve as a generator in response to rotation of the front wheels 10. In this case, an alternating-current power generated by the front-wheel motor 12 is converted into a direct-current power by the inverter 28 to be fed back to the battery 26.

The inverter 32 is coupled to the battery 26 and the rear-wheel motor 16. The inverter 32 converts a direct-current power from the battery 26 into an alternating-current power in accordance with a torque command transmitted from the central control unit 30 to supply the power to the rear-wheel motor 16. The rear-wheel motor 16 consumes the alternating-current power supplied via the inverter 32 to drive the rotary shaft. Thus, the rear-wheel motor 16 drives the rear wheels 14 with the torque in accordance with the torque command via the rear differential gear 22 and the rear drive shaft 24.

The rear-wheel motor 16 above may also serve as a generator in response to rotation of the rear wheels 14. In this case, an alternating-current power generated by the rear-wheel motor 16 is converted into a direct-current power by the inverter 32 to be fed back to the battery 26.

The cooling mechanism 34 includes a cooling pump (not illustrated) and a heat exchanger (not illustrated) that are driven by consuming power from the battery 26. The cooling pump causes cooling water to circulate between the front-wheel motor 12 and the heat exchanger and between the rear-wheel motor 16 and the heat exchanger. As a result, the cooling mechanism 34 cools the front-wheel motor 12 and the rear-wheel motor 16.

The temperature detector 36 detects the temperature of the front-wheel motor 12 (hereinafter also referred to as "front-wheel motor temperature"), and the temperature detector 38 detects the temperature of the rear-wheel motor 16 (hereinafter also referred to as "rear-wheel motor temperature"). The temperature detectors 36 and 38 may each be provided inside a case of a motor or on an outside side surface of the case of the motor.

The depression amount sensor 40 detects a depression amount of a pedal (accelerator pedal) (not illustrated) that receives an acceleration operation performed by a driver. That is, the depression amount sensor 40 detects the acceleration operation performed by the driver.

The drive switch 42 receives an operation performed by the driver for switching a drive mode for the front wheels 10 and the rear wheels 14. For example, the drive switch 42 receives an operation for switching between an electrical-efficiency priority drive mode and a usual all-wheel drive mode.

On the electrical-efficiency priority drive mode, drive control is performed on the front wheels 10 and the rear wheels 14 such as to increase electrical efficiency (efficiency of consumption of power from the battery 26). On the electrical-efficiency priority drive mode, for example, drive control is performed such that the torque of the rear wheels 14 is larger than that of the front wheels 10 during acceleration and the torque of the front wheels 10 is larger than that of the rear wheels 14 during high-speed traveling. In this manner, on the electrical-efficiency priority drive mode, distribution of the torque to the front wheels 10 and the rear wheels 14 is finely controlled depending on the current traveling mode (e.g., acceleration, constant traveling, deceleration, or turn), and thus, the vehicle 1 can travel efficiently.

On the usual all-wheel drive mode, regardless of the current traveling mode, drive control is performed such that a substantially equal torque is distributed to the front wheels 10 and the rear wheels 14. Thus, on the usual all-wheel drive mode, the vehicle 1 can travel stably. Hereinafter, all-wheel drive for driving all of the front wheels 10 and the rear wheels 14 may also be referred to as "AWD".

Note that the usual all-wheel drive mode always employs all-wheel drive (AWD), whereas the electrical-efficiency priority drive mode may employ all-wheel drive (AWD) or front-wheel drive or rear-wheel drive (i.e., 2WD).

The central control unit 30 is constituted by a semiconductor integrated circuit including a central processing unit (CPU), a read-only memory (ROM) storing a program and the like, a random access memory (RAM) as a work area, and the like. The central control unit 30 executes the program to serve as a distribution ratio controller 50.

The distribution ratio controller 50 calculates a requested torque (hereinafter also simply referred to as "torque") that is requested for the vehicle 1 on the basis of the depression amount obtained from the depression amount sensor 40. The distribution ratio controller 50 distributes the calculated requested torque to the front-wheel motor 12 and the rear-wheel motor 16. In other words, the distribution ratio controller 50 proportionally divides the requested torque between the front-wheel motor 12 and the rear-wheel motor 16.

The distribution ratio controller 50 controls the ratio of distribution of the torque to the front-wheel motor 12 and the rear-wheel motor 16, that is, a torque distribution ratio (hereinafter also simply referred to as "distribution ratio").

The distribution ratio controller 50 typically controls the torque distribution ratio such that the traveling of the vehicle 1 has priority. For example, if the electrical-efficiency priority drive mode is set by using the drive switch 42, the distribution ratio controller 50 controls the distribution ratio such that high-electrical-efficiency traveling of the vehicle 1 has priority. In addition, if the usual all-wheel drive mode is set by using the drive switch 42, the distribution ratio controller 50 controls the distribution ratio such that stable traveling of the vehicle 1 has priority. Hereinafter, control of the distribution ratio with priority on the traveling of the vehicle 1 may also be referred to as "traveling priority control".

Although an example of setting the drive mode by using the drive switch 42 is herein described, the setting of the drive mode is not limited to the setting by using the drive switch 42. For example, the distribution ratio controller 50 may set the drive mode (the electrical-efficiency priority drive mode or the usual all-wheel drive mode) taking the traveling mode, a state of charge (SOC) of the battery 26, or the like into account.

In order to increase the torque of a motor, a large amount of current contributing to the torque (q-axis current Iq) flows to the motor. Thus, as the torque of the motor is increased (i.e., the distributed torque is increased), the temperature of the motor gradually increases.

In addition, while the torque distribution ratio is controlled such that the traveling of the vehicle 1 has priority, the torque of one of the motors may continuously be high. For example, while the vehicle 1 travels on the electrical-efficiency priority drive mode at a high speed over a long period, the torque of the rear-wheel motor 16 may continuously be low and the torque of the front-wheel motor 12 may continuously be high. In such a case, the temperature of the front-wheel motor 12 with the higher torque may become higher than the temperature of the rear-wheel motor 16 with the lower torque. That is, in the vehicle 1, the temperature of the front-wheel motor 12 and the temperature of the rear-wheel motor 16 may be imbalanced, and the temperature of one of the motors may become excessively high.

An excessively high temperature of a motor may cause malfunction. Thus, if the motor has an excessively high temperature, driving of the motor is stopped, and the vehicle 1 is driven by using only the other motor the temperature of which is not excessively high. In this case, the vehicle 1 is not driven by both the front wheels 10 and the rear wheels 14, and the efficiency or stability of the vehicle 1 may decrease.

Instead, before a motor has an excessively high temperature, in accordance with the temperatures of the motors, the distribution ratio controller 50 controls the distribution ratio such as to suppress imbalance between the temperature of the front-wheel motor 12 and the temperature of the rear-wheel motor 16. Hereinafter, control of the distribution ratio such as to suppress imbalance between the temperature of the front-wheel motor 12 and the temperature of the rear-wheel motor 16 may also be referred to as "equal temperature control".

Figure 2:
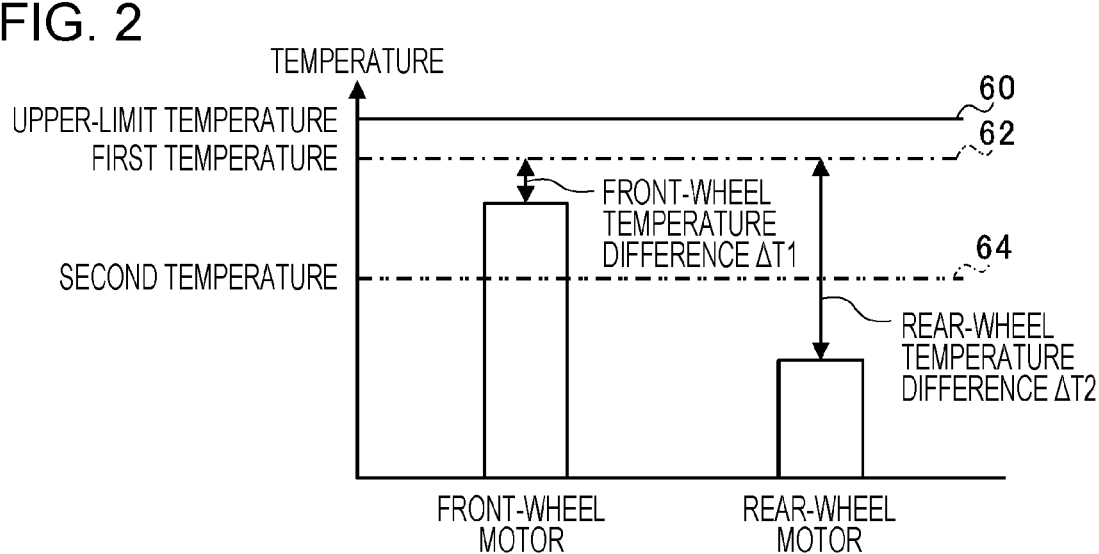
FIG. 2 illustrates an illustrative temperature of a front-wheel motor and an illustrative temperature of a rear-wheel motor.

FIG. 2 illustrates an illustrative temperature of the front-wheel motor 12 and an illustrative temperature of the rear-wheel motor 16. In FIG. 2, a solid line 60 indicates an upper-limit temperature, a one-dot chain line 62 indicates a first temperature, and a two-dot chain line 64 indicates a second temperature.

The upper-limit temperature indicated by the solid line 60 is the upper limit of the temperature at which the motors can be driven without output restriction. The upper-limit temperature is the rated temperature of the motors, for example, and is determined by the specifications of the motors.

The first temperature indicated by the one-dot chain line 62 is set to a value lower than the upper-limit temperature. The first temperature is a threshold used for determination as to whether the output of the front-wheel motor 12 or the output of the rear-wheel motor 16 is to be actually restricted. If a motor has an excessively high temperature, the output thereof is restricted. Details will be described later.

The second temperature indicated by the two-dot chain line 64 is set to a value lower than the first temperature. The second temperature is a threshold used for determination as to whether to perform traveling priority control or equal temperature control. If the temperatures of the motors are lower than or equal to the second temperature, traveling priority control is performed; and if the temperature of at least one of the motors exceeds the second temperature, equal temperature control is performed. Details will be described later. That is, the second temperature is set lower than the first temperature for transition from traveling priority control to equal temperature control before the temperature of a motor reaches the first temperature at which the output of the motor is to be restricted.

In a case illustrated in FIG. 2, the temperature of the front-wheel motor 12 exceeds the second temperature and lower than or equal to the first temperature, and the temperature of the rear-wheel motor 16 is lower than or equal to the second temperature.

In the example illustrated in FIG. 2, the front-wheel motor 12 and the rear-wheel motor 16 have the equal upper-limit temperature, the equal first temperature, and the equal second temperature. However, the front-wheel motor 12 and the rear-wheel motor 16 may have different upper-limit temperatures, first temperatures, and second temperatures.

If both the front-wheel motor temperature and the rear-wheel motor temperature are lower than or equal to the second temperature, the distribution ratio controller 50 performs traveling priority control on the electrical-efficiency priority drive mode or the usual all-wheel drive mode that is set.

If at least one of the front-wheel motor temperature or the rear-wheel motor temperature exceeds the second temperature, the distribution ratio controller 50 performs equal temperature control. Since the front-wheel motor temperature exceeds the second temperature in FIG. 2, equal temperature control is performed.

During equal temperature control, the distribution ratio controller 50 decreases the torque of one of the front-wheel motor 12 and the rear-wheel motor 16 the temperature of which is higher than that of the other and increases the torque of the other. For example, as in FIG. 2, if the front-wheel motor temperature is higher than the rear-wheel motor temperature, the distribution ratio controller 50 controls the distribution ratio such as to decrease the torque of the front-wheel motor 12 and to increase the torque of the rear-wheel motor 16.

For example, during equal temperature control, the distribution ratio controller 50 calculates a front-wheel temperature difference ($\Delta T1$) that is a difference between the first temperature and the temperature of the front-wheel motor 12 and a rear-wheel temperature difference ($\Delta T2$) that is a difference between the first temperature and the temperature of the rear-wheel motor 16. The distribution ratio controller 50 calculates a temperature difference ratio (e.g., $\Delta T1/\Delta T2$) that is a ratio between the front-wheel temperature difference ($\Delta T1$) and the rear-wheel temperature difference ($\Delta T2$). In accordance with the calculated temperature difference ratio, the distribution ratio controller 50 calculates the distribution ratio (e.g., $TQf/TQr$) between the torque of the front-wheel motor 12 ($TQf$) and the torque of the rear-wheel motor 16 ($TQr$). For example, if the temperature difference ratio between the front-wheel temperature difference ($\Delta T1$) and the rear-wheel temperature difference ($\Delta T2$) is 1:5 ($\Delta T1/\Delta T2=1/5$), the distribution ratio controller 50 sets the distribution ratio between the torque of the front-wheel motor 12 ($TQf$) and the torque of the rear-wheel motor 16 ($TQr$) to 1:5 ($TQf/TQr=1/5$).

Thus, although the rear-wheel motor temperature is likely to increase because of the increase in the torque, an increase in the front-wheel motor temperature is suppressed because of the decrease in the torque. The front-wheel motor 12 is cooled by the cooling mechanism 34, and the temperature gradually decreases. As a result, the distribution ratio controller 50 can restore the front-wheel motor temperature lower than or equal to the second temperature, and can make the front-wheel motor temperature and the rear-wheel motor temperature substantially equal to each other.

Although the temperature difference ratio and the distribution ratio are the same (1:5) in the above example, a specific value of the distribution ratio is not limited to the same value as the temperature difference ratio. At least the magnitude relationship between the front-wheel temperature difference and the rear-wheel temperature difference is the same as the magnitude relationship between the torque of the front-wheel motor 12 and the torque of the rear-wheel motor 16. For example, if the temperature difference ratio between the front-wheel temperature difference and the rear-wheel temperature difference is 1:5 and the rear-wheel temperature difference is larger, the distribution ratio between the torque of the front-wheel motor 12 and the torque of the rear-wheel motor 16 may be 1:2 or 2:3, for example, and at least the torque of the rear-wheel motor 16 is larger.

In addition, the distribution ratio controller 50 may set different temperatures as the second temperature on the electrical-efficiency priority drive mode and the second temperature on the usual all-wheel drive mode. For example, while the usual all-wheel drive mode is set, since the torque is constantly distributed to the front-wheel motor 12 and the rear-wheel motor 16, the front-wheel motor temperature and the rear-wheel motor temperature are unlikely to be largely imbalanced. Thus, on the usual all-wheel drive mode, the distribution ratio controller 50 may set the second temperature to a relatively low temperature. In addition, while the electrical-efficiency priority drive mode is set, since the torque may be distributed to only one of the front-wheel motor 12 and the rear-wheel motor 16, the front-wheel motor temperature and the rear-wheel motor temperature is likely to be largely imbalanced. Thus, on the electrical-efficiency priority drive mode, the distribution ratio controller 50 may set the second temperature to a relatively high temperature.

In the above manner, in accordance with the drive mode of the front wheels 10 and the rear wheels 14 (i.e., the type of drive mode such as the electrical-efficiency priority drive mode or the usual all-wheel drive mode), the distribution ratio controller 50 may set different temperatures as the second temperature. Suppose the second temperature is a fixed value, traveling priority control and equal temperature control are often switched depending on the drive mode, and a driver may feel strange or the processing load may increase. Instead, different temperatures may be set as the second temperature in accordance with the drive mode in the vehicle 1. This can suppress an increase in the processing load and can reduce the driver's feeling of strangeness.

In addition, if at least one of the front-wheel motor temperature or the rear-wheel motor temperature exceeds the first temperature, the distribution ratio controller 50 performs output restriction control for restricting the output of the motor.

If the temperature of the front-wheel motor 12 exceeds the first temperature, as output restriction control, the distribution ratio controller 50 sets the torque of the front-wheel motor 12 to zero and drives the vehicle 1 by using only the rear-wheel motor 16. In addition, if the temperature of the rear-wheel motor 16 exceeds the first temperature, as output restriction control, the distribution ratio controller 50 sets the torque of the rear-wheel motor 16 to zero and drives the vehicle 1 by using only the front-wheel motor 12. That is, during output restriction control, all-wheel drive is stopped, and front-wheel drive or rear-wheel drive is employed.

In the above manner, the restriction on the output of the motor having a high temperature (for example, setting the torque to zero) can suppress an increase in the temperature of the motor. The motor the output of which is restricted is cooled by the cooling mechanism 34, and the temperature can be made lower than or equal to the first temperature again.

Thus, in the vehicle 1, output restriction control can prevent malfunction of the motor having a high temperature. In addition, when a motor temperature exceeds the first temperature, before exceeding the upper-limit temperature, the distribution ratio controller 50 performs output restriction control. This can more reliably prevent malfunction of the motor in the vehicle 1.

In addition, even if the motor temperature exceeds the first temperature, as long as the temperature is lower than or equal to the upper-limit temperature, the motor can be driven because of its specifications. Accordingly, even during output restriction control, if the motor temperature is lower than or equal to the upper-limit temperature, and in a case where all-wheel drive (AWD) is to be employed temporarily, the distribution ratio controller 50 stops output restriction control and controls the distribution ratio such as to temporarily employ all-wheel drive. Hereinafter, control of the distribution ratio such as to temporarily employ all-wheel drive may be referred to as "temporary AWD control".

The case where all-wheel drive is to be employed temporarily is, for example, a case where slipping occurs. For example, if a left-right rotational speed difference of any of the front wheels 10 and the rear wheels 14 becomes larger than or equal to a predetermined rotational speed difference, the distribution ratio controller 50 determines that slipping occurs and that all-wheel drive is to be employed temporarily. For example, in a state where the output of the front-wheel motor 12 is restricted and rear-wheel drive is employed, if the rear wheels 14 are slipping, the distribution ratio controller 50 decreases the torque of the rear-wheel motor 16 and increases the torque of the front-wheel motor 12 from zero, temporarily employing all-wheel drive.

In the above manner, by temporarily allowing all-wheel drive, the vehicle 1 can address an unexpected situation and can prevent an accident or the like. In other words, by setting the first temperature to lower than the upper-limit temperature, the vehicle 1 can perform such temporary AWD control, and the vehicle 1 can be controlled more flexibly.

Figure 3:
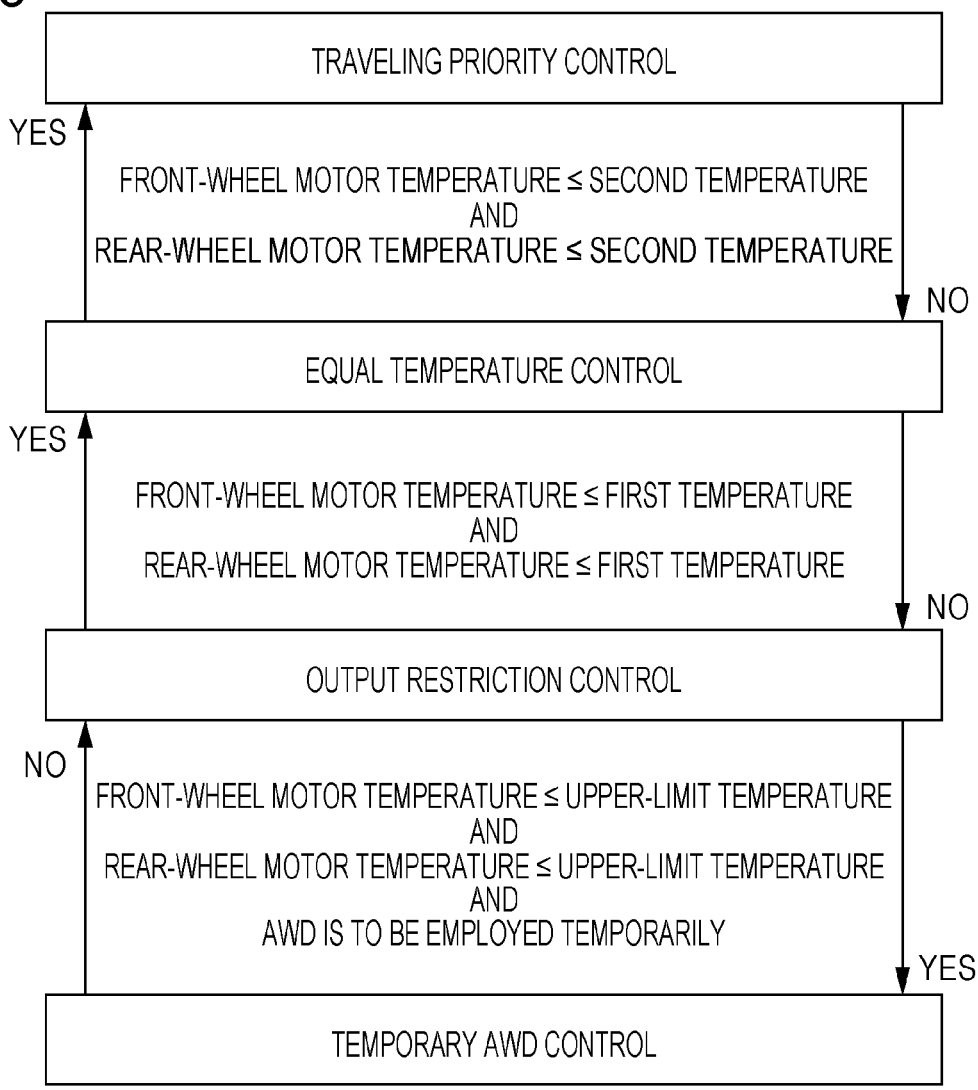
FIG. 3 is a state transition diagram illustrating transition of a control state of a distribution ratio in a distribution ratio controller.

FIG. 3 is a state transition diagram illustrating transition of a control state of the distribution ratio in the distribution ratio controller 50. In accordance with the motor temperatures, the distribution ratio controller 50 transitions among the traveling priority control state, the equal temperature control state, the output restriction control state, and the temporary AWD control state.

If the front-wheel motor temperature is lower than or equal to the second temperature, and if the rear-wheel motor temperature is lower than or equal to the second temperature, the distribution ratio controller 50 is in the traveling priority control state. In the traveling priority control state, if at least one of the front-wheel motor temperature or the rear-wheel motor temperature exceeds the second temperature, the distribution ratio controller 50 transitions from traveling priority control to equal temperature control. In the equal temperature control state, if at least one of the front-wheel motor temperature and the rear-wheel motor temperature exceeds the first temperature, the distribution ratio controller 50 transitions from equal temperature control to output restriction control. In the output restriction control state, if the front-wheel motor temperature is lower than or equal to the upper-limit temperature, if the rear-wheel motor temperature is lower than or equal to the upper-limit temperature, and if AWD is to be employed temporarily, the distribution ratio controller 50 transitions from output restriction control to temporary AWD control.

In the temporary AWD control state, if the front-wheel motor temperature exceeds the upper-limit temperature, if the rear-wheel motor temperature exceeds the upper-limit temperature, or if temporary AWD is no longer employed, the distribution ratio controller 50 transitions from temporary AWD control to output restriction control. In the output restriction control state, if the front-wheel motor temperature becomes lower than or equal to the first temperature, and if the rear-wheel motor temperature becomes lower than or equal to the first temperature, the distribution ratio controller 50 transitions from output restriction control to equal temperature control. In the equal temperature control state, if the front-wheel motor temperature becomes lower than or equal to the second temperature, and if the rear-wheel motor temperature becomes lower than or equal to the second temperature, the distribution ratio controller 50 transitions from equal temperature control to traveling priority control.

In a case of transition from traveling priority control to equal temperature control, and in a case of transition from equal temperature control to traveling priority control, a target value of the torque distribution ratio is changed abruptly. If the actual torque distribution ratio is changed abruptly in accordance with the target value while a driver depresses an accelerator pedal, the behavior of the vehicle 1 may be disturbed, and the driver may feel strange. For example, in a state where a high torque is distributed to the rear-wheel motor 16 during acceleration, if transition to equal temperature control occurs and the torque of the rear-wheel motor 16 is decreased abruptly, the driver may feel strange as if the speed is suddenly decreased.

Thus, in a case where the control state transitions between traveling priority control and equal temperature control, if a pedal (accelerator pedal) that receives an acceleration operation is depressed, the distribution ratio controller 50 suppresses a large temporal change in the actual torque distribution ratio.

Figure 4:
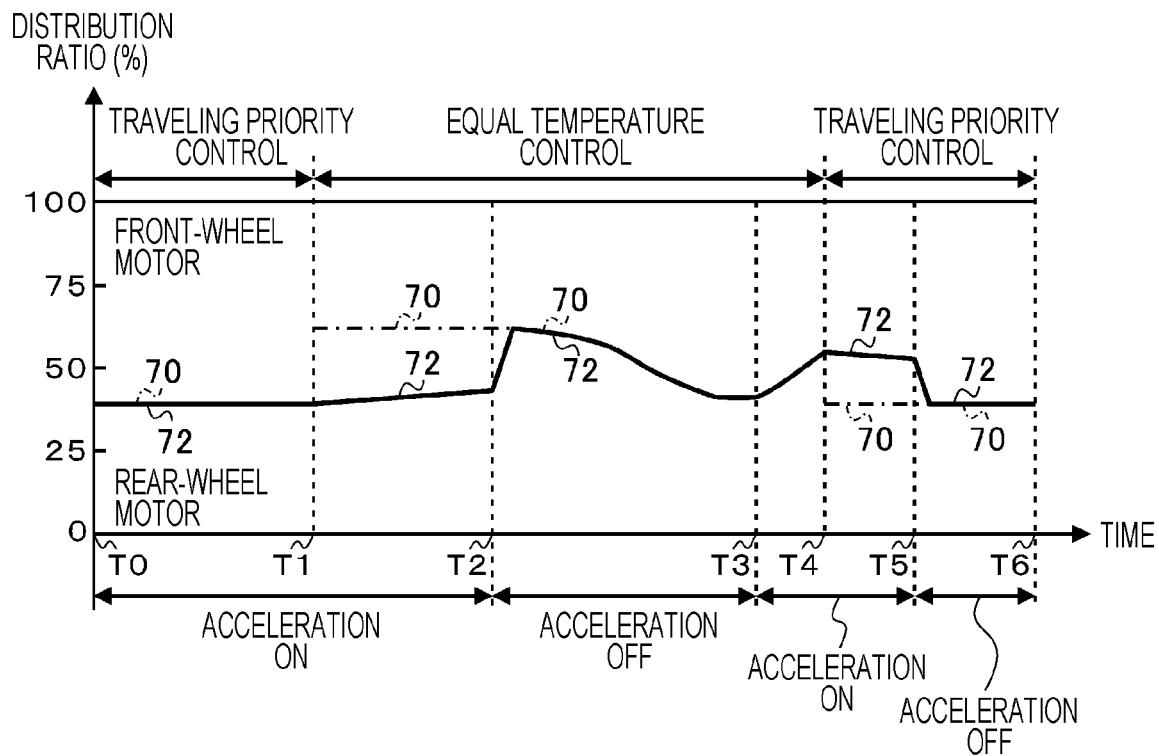
FIG. 4 illustrates a temporal change in the distribution ratio.

FIG. 4 illustrates a temporal change in the distribution ratio. In FIG. 4, a one-dotted chain line 70 indicates the target value of the distribution ratio, and a solid line 72 indicates a command value of the distribution ratio for controlling the distribution ratio to the target value. In addition, in FIG. 4, the distribution ratio is illustrated as a ratio of the torque of the rear-wheel motor 16 to a sum of torques of the front-wheel motor 12 and the rear-wheel motor 16. That is, the region lower than the one-dotted chain line 70 or the solid line 72 in FIG. 4 indicates the torque of the rear-wheel motor 16, and the region thereabove indicates the torque of the front-wheel motor 12. In addition, "acceleration on" indicates that the accelerator pedal is depressed (the depression amount is greater than zero), and "acceleration off" indicates that the accelerator pedal is not depressed (the depression amount is zero).

As illustrated in FIG. 4, for example, in a period between time T0 and time T1, the acceleration is on, and the torque of the front-wheel motor 12 is higher than the torque of the rear-wheel motor 16. During this period, the command value of the distribution ratio is substantially equal to the target value of the distribution ratio. Then, the front-wheel motor temperature exceeds the second temperature at time T1, and the distribution ratio controller 50 transitions from traveling priority control to equal temperature control.

In this case, in accordance with the front-wheel temperature difference and the rear-wheel temperature difference, as illustrated by the one-dotted chain line 70, the distribution ratio controller 50 calculates the target value of the distribution ratio such as to decrease the torque of the front-wheel motor 12 and to increase the torque of the rear-wheel motor 16. Thus, as illustrated by the one-dotted chain line 70, the target value of the distribution ratio is changed abruptly before and after time T1.

However, since the acceleration is on at time T1, the distribution ratio controller 50 sets a small temporal change amount of the command value of the distribution ratio. For example, from time T1 to time T2 until which "acceleration on" is maintained, the distribution ratio controller 50 slowly changes the command value of the distribution ratio toward the target value (e.g., about 2 to 3% per second).

Then, at and after time T2 at which the acceleration is off, the distribution ratio controller 50 quickly changes the command value of the distribution ratio toward the target value (e.g., about 10% per second). Thus, as illustrated between time T2 and time T3, the command value of the distribution ratio becomes substantially equal to the target value.

The acceleration is on at time T3. At time T4, both the front-wheel motor temperature and the rear-wheel motor temperature become lower than or equal to the second temperature, and the distribution ratio controller 50 transitions from equal temperature control to traveling priority control. In addition, immediately before time T4, the torque of the rear-wheel motor 16 is higher than the torque of the front-wheel motor 12. Furthermore, at time T4, the distribution ratio controller 50 calculates the target value of the distribution ratio such as to decrease the torque of the rear-wheel motor 16 and to increase the torque of the front-wheel motor 12 on the electrical-efficiency priority drive mode. Then, as illustrated by the one-dotted chain line 70, the target value of the distribution ratio is changed abruptly before and after time T4.

However, since the acceleration is on at time T4, the distribution ratio controller 50 sets a small temporal change amount of the command value of the distribution ratio. For example, from time T4 to time T5 until which "acceleration on" is maintained, the distribution ratio controller 50 slowly changes the command value of the distribution ratio toward the target value (e.g., about 2 to 3% per second).

Then, at and after time T5 at which the acceleration is off, the distribution ratio controller 50 quickly changes the command value of the distribution ratio toward the target value (e.g., about 10% per second). Thus, as illustrated between time T5 and time T6, the command value of the distribution ratio becomes substantially equal to the target value.

In the above manner, in a case where the accelerator pedal (pedal that receives an acceleration operation) is depressed, the distribution ratio controller 50 sets a smaller amount as the temporal change amount of the command value of the distribution ratio than the temporal change amount of the command value of the distribution ratio in a case where the accelerator pedal is not depressed.

Thus, the small temporal change amount of the distribution ratio is set in the vehicle 1 while the torque is applied, thereby suppressing a sudden change in the behavior of the vehicle 1. As a result, in the vehicle 1, even if the control state transitions between traveling priority control and equal temperature control while the accelerator pedal is depressed, the driver can be prevented from feeling strange.

Figure 5:
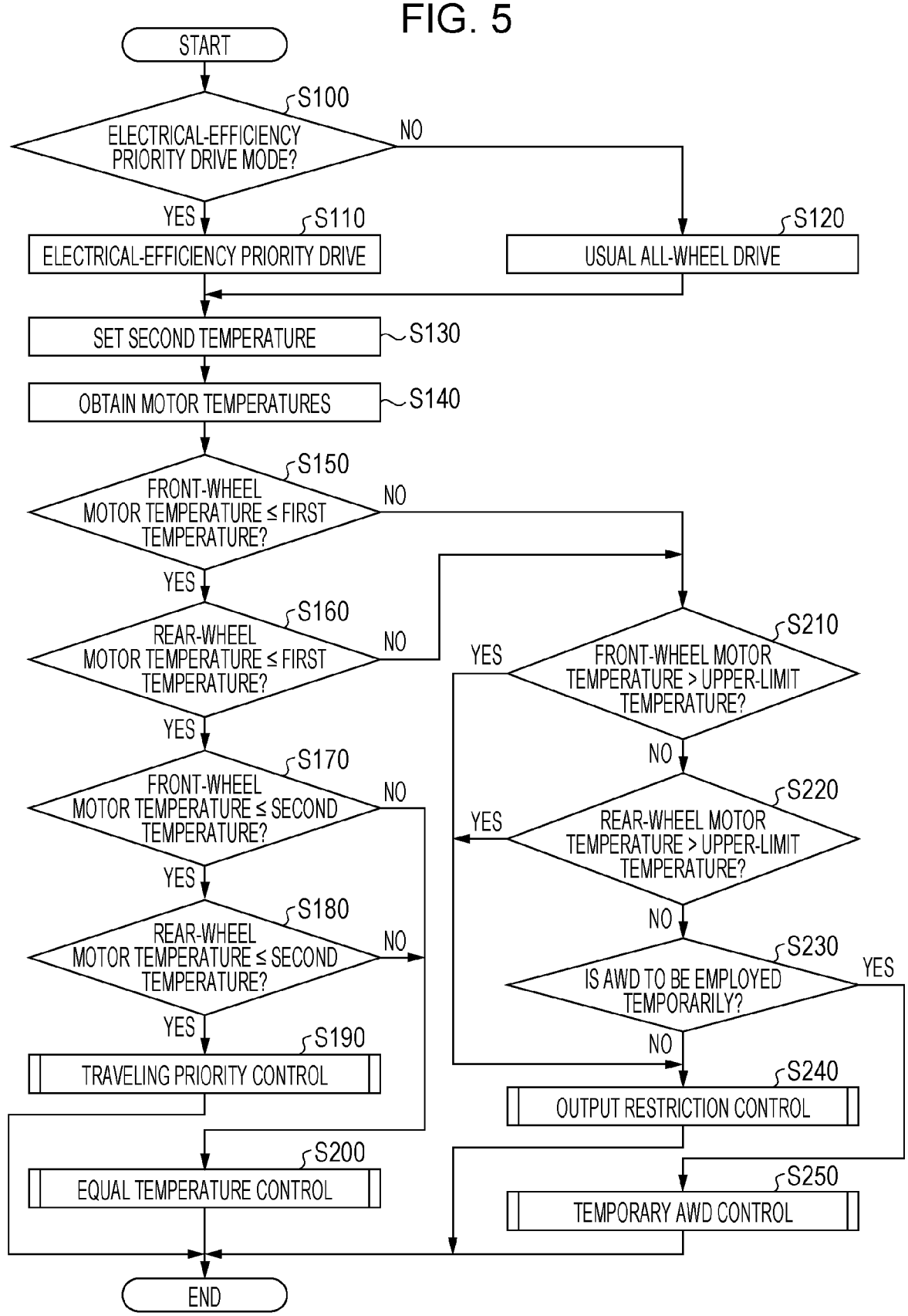
FIG. 5 is a flowchart illustrating a flow of operation of the distribution ratio controller.

FIG. 5 is a flowchart illustrating a flow of operation of the distribution ratio controller 50. The distribution ratio controller 50 repeats the process in FIG. 5 as interruption control in a predetermined cycle.

At the start time of interruption control, the distribution ratio controller 50 determines whether the electrical-efficiency priority drive mode has been selected by using the drive switch 42 (S100). If the electrical-efficiency priority drive mode has been selected by using the drive switch 42 (YES in S100), the distribution ratio controller 50 sets the drive mode to the electrical-efficiency priority drive mode (S110) and proceeds to step S130.

If the electrical-efficiency priority drive mode has not been selected by using the drive switch 42 (i.e., the usual all-wheel drive mode has been selected) (NO in S100), the distribution ratio controller 50 sets the drive mode to the usual all-wheel drive mode (S120) and proceeds to step S130.

After having set the drive mode (S110, S120), the distribution ratio controller 50 sets the second temperature in accordance with the drive mode that is set (S130). For example, the distribution ratio controller 50 sets the second temperature to a relatively high temperature if the electrical-efficiency priority drive mode has been set, and sets the second temperature to a relatively low temperature if the usual all-wheel drive mode has been set.

Subsequently, the distribution ratio controller 50 obtains the front-wheel motor temperature from the temperature detector 36 and obtains the rear-wheel motor temperature from the temperature detector 38 (S140).

Subsequently, the distribution ratio controller 50 determines whether the obtained front-wheel motor temperature is lower than or equal to the first temperature (S150). If the front-wheel motor temperature is not lower than or equal to the first temperature (NO in S150), the distribution ratio controller 50 proceeds to step S210.

If the front-wheel motor temperature is lower than or equal to the first temperature (YES in S150), the distribution ratio controller 50 determines whether the rear-wheel motor temperature is lower than or equal to the first temperature (S160). If the rear-wheel motor temperature is not lower than or equal to the first temperature (NO in step S160), the distribution ratio controller 50 proceeds to step S210.

If the rear-wheel motor temperature is lower than or equal to the first temperature (YES in S160), the distribution ratio controller 50 proceeds to step S170. That is, the distribution ratio controller 50 proceeds to step S170 if both the front-wheel motor temperature and the rear-wheel motor temperature are lower than or equal to the first temperature, and proceeds to step S210 if at least one of the front-wheel motor temperature or the rear-wheel motor temperature exceeds the first temperature.

In step S170, the distribution ratio controller 50 determines whether the front-wheel motor temperature is lower than or equal to the second temperature (S170). If the front-wheel motor temperature is lower than or equal to the second temperature (YES in S170), the distribution ratio controller 50 determines whether the rear-wheel motor temperature is lower than or equal to the second temperature (S180).

If the rear-wheel motor temperature is lower than or equal to the second temperature (YES in S180), the distribution ratio controller 50 performs traveling priority control in accordance with the electrical-efficiency priority drive mode or the usual all-wheel drive mode (S190) and ends this process. The flow of traveling priority control will be described later.

If the front-wheel motor temperature is not lower than or equal to the second temperature (NO in S170), or if the rear-wheel motor temperature is not lower than or equal to the second temperature (NO in S180), the distribution ratio controller 50 performs equal temperature control in accordance with the temperatures of the motors (S200) and ends this process. The flow of equal temperature control will be described later.

In step S210, the distribution ratio controller 50 determines whether the front-wheel motor temperature exceeds the upper-limit temperature (S210). If the front-wheel motor temperature does not exceed the upper-limit temperature (NO in S210), the distribution ratio controller 50 determines whether the rear-wheel motor temperature exceeds the upper-limit temperature (S220). If the rear-wheel motor temperature does not exceed the upper-limit temperature (NO in S220), the distribution ratio controller 50 determines whether all-wheel drive (AWD) is to be employed temporarily (S230). For example, if a rotational speed difference between left and right wheels is larger than or equal to a predetermined rotational speed difference, the distribution ratio controller 50 determines that slipping occurs and that all-wheel drive is to be employed temporarily.

If the front-wheel motor temperature exceeds the upper-limit temperature (YES in S210), if the rear-wheel motor temperature exceeds the upper-limit temperature (YES in S220), or if all-wheel drive is not to be employed temporarily (NO in S230), the distribution ratio controller 50 performs output restriction control (S240) and ends this process. The flow of output restriction control will be described later.

If all-wheel drive is to be employed temporarily (YES in S230), the distribution ratio controller 50 performs temporary AWD control (S250) and ends this process. The flow of temporary AWD control will be described alter.

Figure 6:
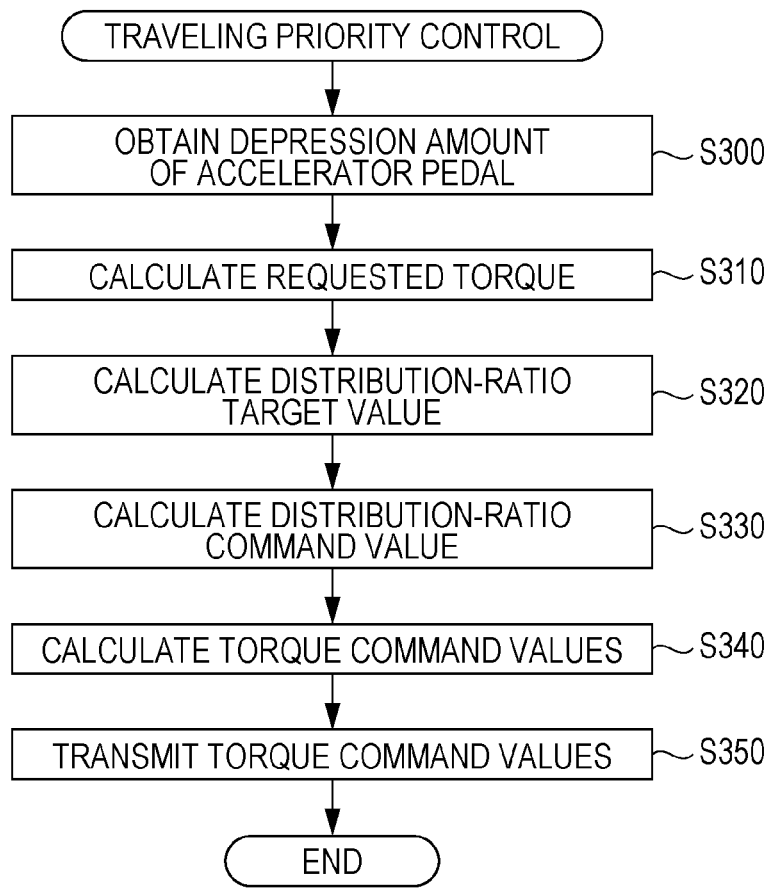
FIG. 6 is a flowchart illustrating a flow of traveling priority control.

FIG. 6 is a flowchart illustrating the flow of traveling priority control. First, the distribution ratio controller 50 obtains the depression amount of the accelerator pedal from the depression amount sensor 40 (S300). Subsequently, the distribution ratio controller 50 calculates a requested torque on the basis of the obtained depression amount (S310).

Subsequently, in accordance with the current drive mode (the electrical-efficiency priority drive mode or the usual all-wheel drive mode), the distribution ratio controller 50 calculates the target value of the torque distribution ratio (S320). For example, if the current drive mode is the electrical-efficiency priority drive mode, the distribution ratio controller 50 calculates the target value of the distribution ratio such as to increase the electrical efficiency on the basis of the current traveling mode, power consumption of each motor, and the like.

Subsequently, on the basis of the target value of the distribution ratio, the distribution ratio controller 50 calculates the command value of the distribution ratio (S330). At this time, if the depression amount is not continuously zero from when the control state transitions from equal temperature control to traveling priority control, the distribution ratio controller 50 calculates the command value of the current distribution ratio such that the change amount of the command value is small.

Subsequently, on the basis of the command value of the distribution ratio and the requested torque, the distribution ratio controller 50 calculates the torque command value for the front-wheel motor 12 and the torque command value for the rear-wheel motor 16 (S340).

Subsequently, the distribution ratio controller 50 transmits the torque command value for the front-wheel motor 12 to the inverter 28 and transmits the torque command value for the rear-wheel motor 16 to the inverter 32 (S350) and ends this process.

Figure 7:
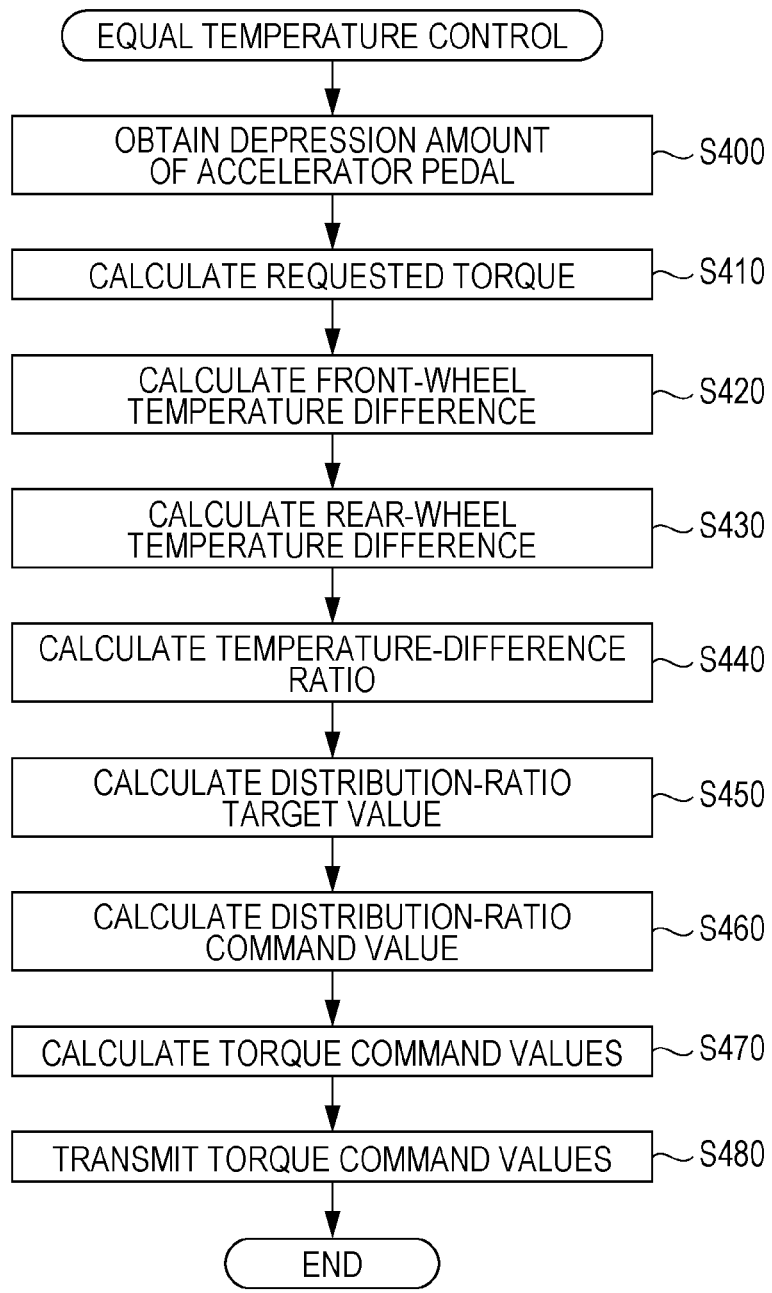
FIG. 7 is a flowchart illustrating a flow of equal temperature control.

FIG. 7 is a flowchart illustrating the flow of equal temperature control. First, the distribution ratio controller 50 obtains the depression amount of the accelerator pedal from the depression amount sensor 40 (S400). Subsequently, the distribution ratio controller 50 calculates a requested torque on the basis of the obtained depression amount (S410).

Subsequently, the distribution ratio controller 50 calculates the front-wheel temperature difference from the front-wheel motor temperature and the first temperature (S420) and calculates the rear-wheel temperature difference from the rear-wheel motor temperature and the first temperature (S430). Subsequently, the distribution ratio controller 50 calculates the temperature difference ratio from the front-wheel temperature difference and the rear-wheel temperature difference (S440).

Subsequently, on the basis of the temperature difference ratio, the distribution ratio controller 50 calculates the target value of the torque distribution ratio (S450). For example, the distribution ratio controller 50 calculates the target value of the distribution ratio such as to increase the torque of one of the front wheels 10 and the rear wheels 14 having the larger temperature difference and to decrease the torque of the other.

Subsequently, on the basis of the target value of the distribution ratio, the distribution ratio controller 50 calculates the command value of the distribution ratio (S460). At this time, if the depression amount is not continuously zero from when the control state transitions from traveling priority control to equal temperature control, the distribution ratio controller 50 calculates the command value of the current distribution ratio such that the change amount of the command value is small.

Subsequently, on the basis of the command value of the distribution ratio and the requested torque, the distribution ratio controller 50 calculates the torque command value for the front-wheel motor 12 and the torque command value for the rear-wheel motor 16 (S470).

Subsequently, the distribution ratio controller 50 transmits the torque command value for the front-wheel motor 12 to the inverter 28 and transmits the torque command value for the rear-wheel motor 16 to the inverter 32 (S480) and ends this process.

Figure 8:
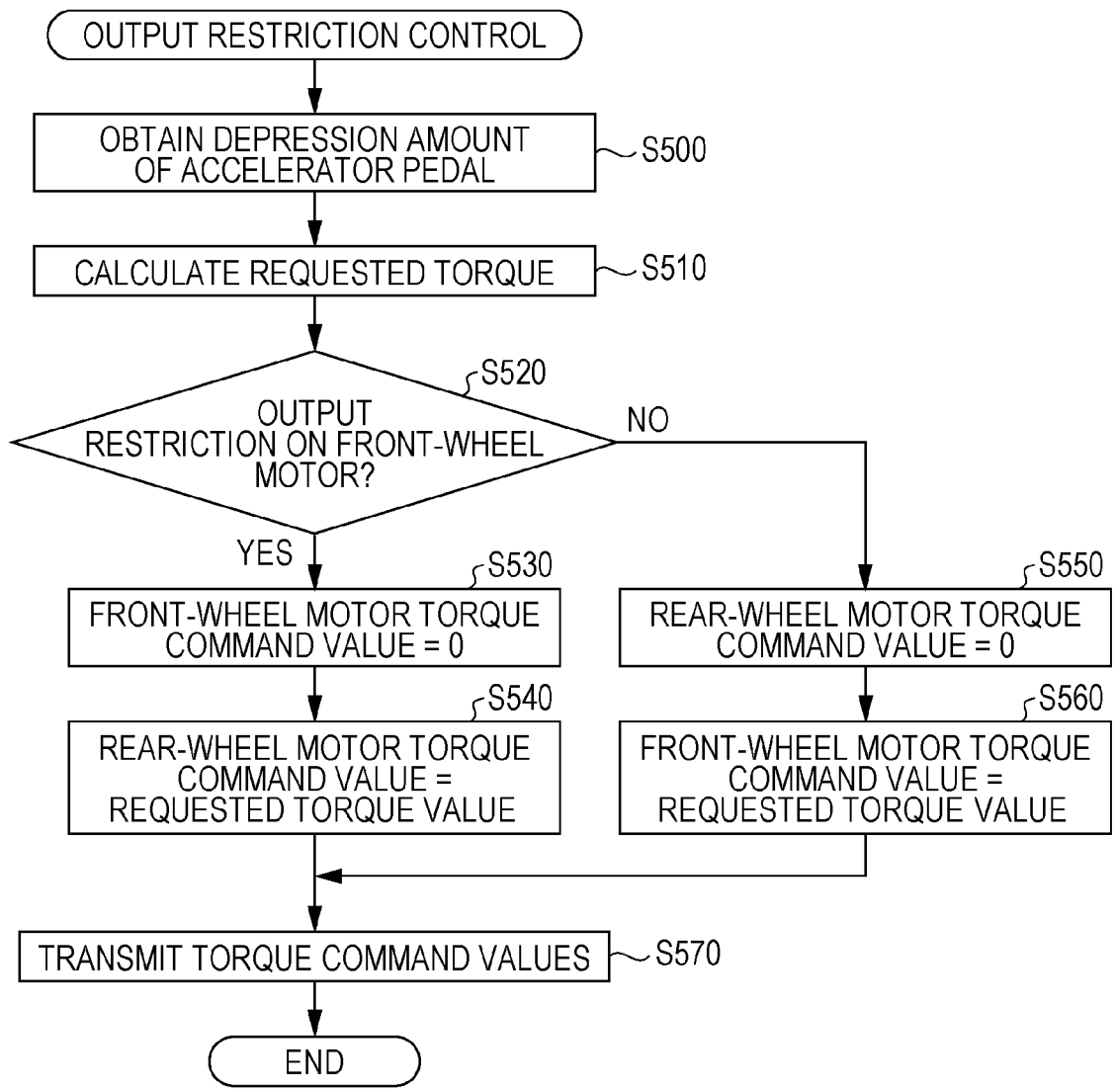
FIG. 8 is a flowchart illustrating a flow of output restriction control.

FIG. 8 is a flowchart illustrating the flow of output restriction control. First, the distribution ratio controller 50 obtains the depression amount of the accelerator pedal from the depression amount sensor 40 (S500). Subsequently, the distribution ratio controller 50 calculates a requested torque on the basis of the obtained depression amount (S510).

Subsequently, of the front-wheel motor 12 and the rear-wheel motor 16, the distribution ratio controller 50 determines whether output of the front-wheel motor 12 is restricted (S520). That is, if the front-wheel motor temperature exceeds the first temperature (NO in S150 in FIG. 5) and output restriction control is performed (S240 in FIG. 5), the distribution ratio controller 50 determines that the output of the front-wheel motor 12 is restricted. Note that the distribution ratio controller 50 determines that the output of the rear-wheel motor 16 is restricted if the rear-wheel motor temperature exceeds the first temperature (NO in S160 in FIG. 5) and output restriction control is performed (S240).

If it is determined that the output of the front-wheel motor 12 is restricted (YES in S520), the distribution ratio controller 50 sets the torque command value of the front-wheel motor 12 to zero (S530) and the torque command value of the rear-wheel motor 16 to the requested torque value (S540). Subsequently, the distribution ratio controller 50 transmits the torque command value indicating zero to the inverter 28 for the front-wheel motor 12 and transmits the torque command value indicating the requested torque to the inverter 32 for the rear-wheel motor 16 (S570) and ends this process.

If it is determined that the output of the front-wheel motor 12 is not restricted (NO in S520), it is determined that the output of the rear-wheel motor 16 is restricted, and the distribution ratio controller 50 sets the torque command value of the rear-wheel motor 16 to zero (S550) and the torque command value of the front-wheel motor 12 to the requested torque value (S560). Subsequently, the distribution ratio controller 50 transmits the torque command value indicating the requested torque to the inverter 28 for the front-wheel motor 12 and transmits the torque command value indicating zero to the inverter 32 for the rear-wheel motor 16 (S570) and ends this process.

Figure 9:
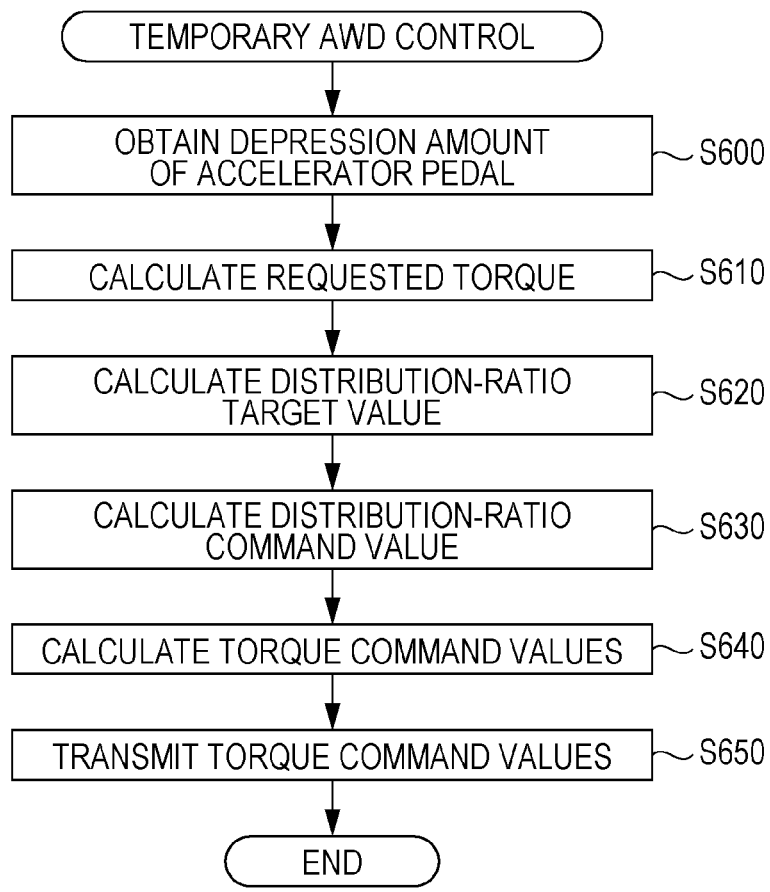
FIG. 9 is a flowchart illustrating a flow of temporary AWD control.

FIG. 9 is a flowchart illustrating the flow of temporary AWD control. In temporary AWD control, typically, substantially the same process as traveling priority control is performed.

For example, the distribution ratio controller 50 obtains the depression amount of the accelerator pedal from the depression amount sensor 40 (S600), and calculates a requested torque on the basis of the obtained depression amount (S610). Subsequently, in accordance with the state of the vehicle 1 for which AWD is to be employed, such as slipping, the distribution ratio controller 50 calculates the target value of the torque distribution ratio (S620). Subsequently, on the basis of the target value of the distribution ratio, the distribution ratio controller 50 calculates the command value of the distribution ratio (S630). Subsequently, on the basis of the command value of the distribution ratio and the requested torque, the distribution ratio controller 50 calculates the torque command value for the front-wheel motor 12 and the torque command value for the rear-wheel motor 16 (S640). Subsequently, the distribution ratio controller 50 transmits the torque command value for the front-wheel motor 12 to the inverter 28 and transmits the torque command value for the rear-wheel motor 16 to the inverter 32 (S650) and ends this process.

As described above, if one of the front-wheel motor temperature and the rear-wheel motor temperature exceeds the second temperature, which is a value lower than a first temperature that is a threshold used for determination as to whether output of the front-wheel motor 12 or output of the rear-wheel motor 16 is to be restricted, the distribution ratio controller 50 in the vehicle 1 according to the embodiment decreases the torque of one of the front-wheel motor 12 and the rear-wheel motor 16 the temperature of which is higher than the other and increases the torque of the other.

For example, if one of the temperature of the front-wheel motor 12 and the temperature of the rear-wheel motor 16 exceeds the second temperature, in accordance with the temperature difference ratio between the front-wheel temperature difference, which is a difference between the first temperature and the temperature of the front-wheel motor 12, and the rear-wheel temperature difference, which is a difference between the first temperature and the temperature of the rear-wheel motor 16, the distribution ratio controller 50 calculates the distribution ratio between the torque of the front-wheel motor 12 and the torque of the rear-wheel motor 16.

Thus, before the output of the front-wheel motor 12 or the rear-wheel motor 16 is restricted, the vehicle 1 according to the embodiment can suppress an increase in the temperature of the motor having the higher temperature. The increase in the temperature of the motor having the higher temperature is suppressed in the vehicle 1 according to the embodiment, thereby increasing time before the temperature of the motor reaches the first temperature or the upper-limit temperature.

Thus, the vehicle 1 according to the embodiment can suppress restriction of the output of the front-wheel motor 12 or the rear-wheel motor 16. As a result, the vehicle 1 according to the embodiment can suppress forced employment of front-wheel drive or rear-wheel drive (2WD).

Note that the embodiment has described an example in which the first temperature is set lower than the upper-limit temperature. However, if temporary AWD control is omitted, the distribution ratio controller 50 may set the first temperature equal to the upper-limit temperature. Also in this embodiment, restriction of the output of the front-wheel motor 12 or the rear-wheel motor 16 can be suppressed.

The embodiment of the disclosure has been described above with reference to the attached drawings. However, it is needless to say that the disclosure is not limited to the embodiment. It is obvious that a person skilled in the art may arrive at various changes or modifications without departing from the scope of the claims, and that these changes or modifications also belong to the technical scope of the disclosure.

The central control unit 30 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the central control unit 30 including the distribution ratio controller 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle comprising:
   a front-wheel motor configured to drive a front wheel;
   a rear-wheel motor configured to drive a rear wheel;
   a temperature detector configured to detect a temperature of the front-wheel motor and a temperature of the rear-wheel motor; and
   a distribution ratio controller configured to, when one of the temperature of the front-wheel motor and the temperature of the rear-wheel motor exceeds a second temperature, decrease a torque of one of the front-wheel motor and the rear-wheel motor the temperature of which is higher than the other and increase a torque of the other,
   wherein the second temperature includes a value set lower than a first temperature that is a threshold used for determination as to whether output of the front-wheel motor or output of the rear-wheel motor is to be restricted.

2. The vehicle according to claim 1, wherein, if one of the temperature of the front-wheel motor and the temperature of the rear-wheel motor exceeds the second temperature, the distribution ratio controller controls, in accordance with a temperature difference ratio between a front-wheel temperature difference and a rear-wheel temperature difference, a distribution ratio between the torque of the front-wheel motor and the torque of the rear-wheel motor, the front-wheel temperature difference being a difference between the first temperature and the temperature of the front-wheel motor, the rear-wheel temperature difference being a difference between the first temperature and the temperature of the rear-wheel motor.

3. The vehicle according to claim 2, wherein, in a case where a pedal that receives an acceleration operation is depressed, the distribution ratio controller makes a temporal change amount of a command value for controlling the distribution ratio to the target value smaller than in a case where the pedal is not depressed.

4. The vehicle according to claim 3, wherein the distribution ratio controller changes the second temperature in accordance with a drive mode of the front wheel and the rear wheel.

5. The vehicle according to claim 2, wherein the distribution ratio controller changes the second temperature in accordance with a drive mode of the front wheel and the rear wheel.

6. The vehicle according to claim 1, wherein the distribution ratio controller changes the second temperature in accordance with a drive mode of the front wheel and the rear wheel.

7. The vehicle according to claim 1, wherein, in a case where one of the temperature of the front-wheel motor and the temperature of the rear-wheel motor exceeds the first temperature, the temperature of the front-wheel motor and the temperature of the rear-wheel motor are lower than respective upper-limit drive temperatures, and all-wheel drive (AWD) is determined to be employed temporarily, the distribution ratio controller controls the distribution ratio between the torque of the front-wheel motor and the torque of the rear-wheel motor such as to temporarily employ all-wheel drive.

8. The vehicle according to claim 1, wherein a value of the decreased torque of the one of the front-wheel motor and the rear-wheel motor is greater than 0.

9. The vehicle according to claim 1, wherein both of the front-wheel motor and the rear-wheel motor have a torque when one of the temperature of the front-wheel motor and the temperature of the rear-wheel motor exceeds a second temperature.

10. The vehicle according to claim 1, wherein the distribution ratio controller controls the torque of one of the front-wheel motor and the rear-wheel motor while maintaining all-wheel drive (AWD).

11. The vehicle according to claim 1, wherein the second temperature includes a front-wheel motor second temperature and a rear-wheel motor second temperature that are different from each other.

12. A vehicle comprising:
   a front-wheel motor configured to drive a front wheel;
   a rear-wheel motor configured to drive a rear wheel;
   a temperature detector configured to detect a temperature of the front-wheel motor and a temperature of the rear-wheel motor; and
   circuitry configured to, when one of the temperature of the front-wheel motor and the temperature of the rear-wheel motor exceeds a second temperature, decrease a torque of one of the front-wheel motor and the rear-wheel motor the temperature of which is higher than the other and increase a torque of the other, wherein the second temperature includes a value set lower than a first temperature that is a threshold used for determination as to whether output of the front-wheel motor or output of the rear-wheel motor is to be restricted.

13. The vehicle according to claim 12, wherein a value of the decreased torque of the one of the front-wheel motor and the rear-wheel motor is greater than 0.

14. The vehicle according to claim 12, wherein both of the front-wheel motor and the rear-wheel motor have a torque when one of the temperature of the front-wheel motor and the temperature of the rear-wheel motor exceeds a second temperature.

15. The vehicle according to claim 12, wherein the circuitry controls the torque of one of the front-wheel motor and the rear-wheel motor while maintaining all-wheel drive (AWD).

16. The vehicle according to claim 12, wherein the second temperature includes a front-wheel motor second temperature and a rear-wheel motor second temperature that are different from each other.

* * * * *